USOO5695142A

United States Patent [19]
Rotter

[11] Patent Number: 5,695,142
[45] Date of Patent: Dec. 9, 1997

[54] TAPE CARTRIDGE DRIVE BELT HAVING A LOW RATIO OF STATIC TO DYNAMIC FRICTION OVER EXTENDED USE

[76] Inventor: Gerhard Rotter, 25692 Cervantes La., Mission Viejo, Calif. 92691

[21] Appl. No.: 707,052

[22] Filed: Sep. 3, 1996

Related U.S. Application Data

[63] Continuation of Ser. No. 498,903, Jul. 6, 1995, abandoned.

[51] Int. Cl.$^6$ .................................................. G11B 23/087
[52] U.S. Cl. ................. 242/340; 242/342; 242/352.4; 474/249; 474/250
[58] Field of Search ..................... 242/240, 342, 242/352.4; 360/132; 434/249, 250

[56] References Cited

U.S. PATENT DOCUMENTS

| | | | |
|---|---|---|---|
| 1,255,525 | 2/1918 | Gardner | 474/249 |
| 2,017,291 | 10/1935 | Pfleger | 474/249 |
| 2,181,001 | 11/1939 | Smith | 474/249 |
| 2,677,969 | 5/1954 | Waugh | 474/249 |
| 4,342,809 | 8/1982 | Newell | 242/352.4 |
| 4,422,598 | 12/1983 | Groenewegen et al. | |
| 4,466,564 | 8/1984 | Smith et al. | 242/352.4 |
| 4,739,951 | 4/1988 | Zevvin | |
| 5,199,660 | 4/1993 | Smith | 242/340 |
| 5,203,519 | 4/1993 | Rotter | |
| 5,211,608 | 5/1993 | Wong et al. | 474/249 |
| 5,314,140 | 5/1994 | Rotter | |
| 5,397,072 | 3/1995 | Shoeppel et al. | 242/342 |

FOREIGN PATENT DOCUMENTS

| | | | |
|---|---|---|---|
| 673657 | 1/1930 | France | 474/250 |
| 751872 | 9/1933 | France | 474/250 |
| 528128 | 5/1929 | Germany | 474/249 |
| 611975 | 4/1935 | Germany | 474/249 |
| 478209 | 2/1953 | Italy | 474/249 |
| 261456 | 5/1949 | Switzerland | 474/249 |
| 1581933 | 7/1990 | U.S.S.R. | 474/249 |
| 300476 | 11/1928 | United Kingdom | 474/249 |
| 452982 | 9/1936 | United Kingdom | 474/250 |
| 581025 | 9/1946 | United Kingdom | 474/250 |

*Primary Examiner*—John P. Darling
*Attorney, Agent, or Firm*—Arthur Freilich; Lee Jay Mandell

[57] ABSTRACT

A magnetic tape cartridge incorporating a drive belt characterized by a pattern of recesses in the belt surface in contact with the magnetic tape which are used to provide traps for tape contaminants. Different types of patterns are used to eliminate tension variations which would otherwise occur as a consequence of tape contaminants during the projected life of the cartridge.

15 Claims, 8 Drawing Sheets

TAPE CARTRIDGE DRIVE BELT HAVING A LOW RATIO OF STATIC TO DYNAMIC FRICTION OVER EXTENDED USE

This application is a continuation of U.S. patent application Ser. No. 08/498,903, filed Jul. 6, 1995, now abandoned.

BACKGROUND OF THE INVENTION

The present invention pertains to belt driven magnetic tape cartridges and more particularly, to drive belts therefor. In a bidirectional drive tape cartridge in which the tape moves at high speeds between two reels and is subjected to high accelerations when the tape direction is reversed, it is important to minimize tape tension variations at the transducer head. Otherwise tape to head contact may be lost and data compromised.

U.S. Pat. Nos. 5,203,519 and 5,314,140 describe magnetic tape cartridges including improved drive belts for engaging a magnetic tape to transport the tape between first and second spaced reels. The drive belt improvements are based on the recognition that variations in tape tension and speed can be minimized by minimizing the difference between the static and dynamic coefficients of friction between the engaged surfaces of the tape and drive belt. More specifically, these patents describe drive belts with drive surfaces having a frictional characteristic relative to the tape surface such that the ratio of static to dynamic coefficients of friction between the surfaces is less than 2.

SUMMARY OF THE INVENTION

The present invention is directed to an improved drive belt of the type described in said U.S. Pat. Nos. 5,203,519 and 5,314,140 and is characterized by a pattern of shallow recesses in the belt surface in contact with the magnetic tape. The recesses act to trap contaminants (e.g., minute amounts of debris or chemical compounds from the tape) which might otherwise unfavorably affect the frictional characteristics of the belt, i.e., the ratio of static to dynamic coefficients of friction, after extended periods of operation.

In accordance with a preferred embodiment, the drive belt has an inner surface in contact with the tape having a pattern of essentially visible recesses for trapping and collecting contaminants for maintaining over time the frictional characteristic relative to said tape surface such that the ratio of static to dynamic coefficients of friction between said surfaces is less than 2. Such recesses preferably have depths less than the thickness of the belt but sufficiently large such that the bottom of the recesses do not touch the tape, and preferably have widths of at least 0.0016".

Embodiments of the present invention preferably have recesses having a maximum width of less than 25% of the width of the belt and are formed as elongate grooves having various inclinations relative to the edge of the belt. Other embodiments include patterns of circular, oval and rectangular recesses.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
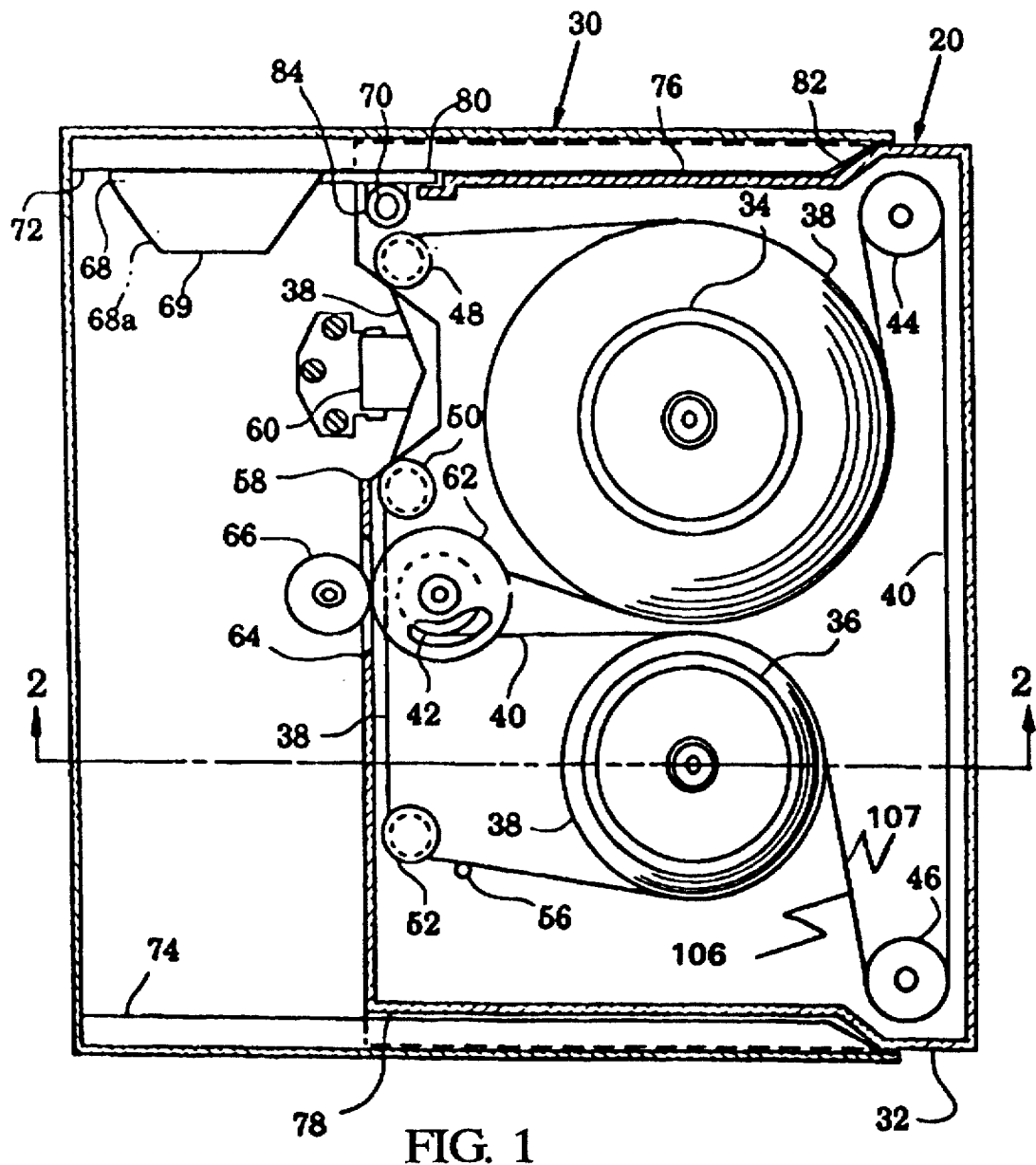
FIG. 1 is a sectional plan view of a typical magnetic tape cartridge.

FIG. 1 is a sectional view of an exemplary belt driven tape cartridge 20. The tape cartridge 20, which is shown positioned in a support deck 30, has a shell 32 in which a pair of reels 34, 36 are mounted with a magnetic tape 38 convolutely wound thereon. The magnetic tape 38 has a first end coupled to reel 34 and a second end coupled to reel 36. A flexible drive belt 40 closely contacts the tape 38 wound about each reel 34, 36. The belt 40 also is led around a belt drive roller 42 and a pair of belt guide rollers 44, 46. Thus, the belt 40 moves linearly in response to rotation of the belt drive roller 42 to cause the reels 34, 36 to rotate by means of surface friction between the belt 40 and the magnetic tape 38.

The magnetic tape 38 passes around three tape guides 48, 50, and 52. Between the reel 36 and the tape guide 52, the magnetic tape 38 is preferably led over a tape wrap pin 56. The tape guides 48, 50 are positioned on either side of an opening 58 in the shell 32 where a transducer head 60, mounted on the support deck 30, contacts the magnetic tape 38.

The belt drive roller 42 has a rim portion 62 which contacts, through an aperture 64 in the shell 32, a drive roller 66 which extends up from the support deck 30. Thus, the drive roller 66, through the belt drive roller 42 and its rim 62, can drive the belt 40 in either direction causing the magnetic tape 38 to pass over the transducer head 60 as it is exchanged between the reels 34, 36.

A door 68, having a flange 69 corresponding to the opening 58, is pivotally mounted on a pivot stud 70 and covers the opening 58 except when the tape cartridge 20 is inserted into the support deck 30. When inserted, cartridge guides 72, 74 in the support deck slide into recesses 76, 78 in the shell 32 and a tab 80 on the door 68 is pushed aside by a bevel 82 on the guide 72. The door 68 thus swings to the open position 68a shown in FIG. 1 making the magnetic tape 38 available for contact with the transducer head 60 through the opening 58. The door 68 is urged by a spring 84 which causes it to close over the opening 58 upon removal of the tape cartridge 20 from the support deck 30.

Figure 2:
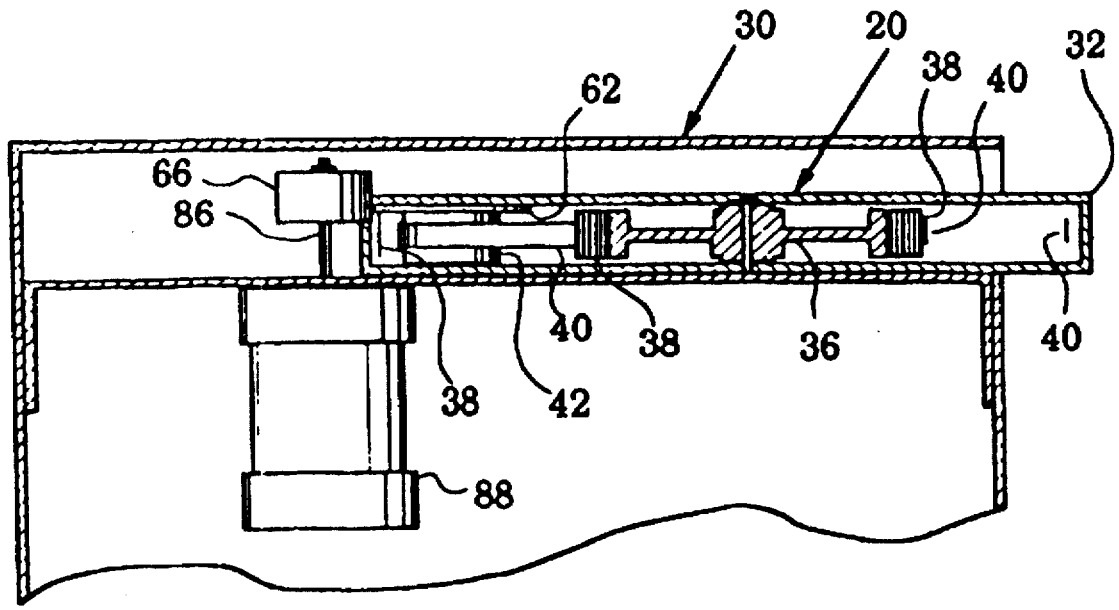
FIG. 2 is a sectional view along the line 2—2 of FIG. 1.

FIG. 2 is a view along the line 2—2 of FIG. 1 and shows the tape cartridge 20 in the support deck 30. The drive roller 66 extends upward on a drive shaft 86 from a reversible motor 88 and contacts the rim 62 of the belt drive roller 42 through the aperture (64 in FIG. 1) in the shell 32. The belt 40 is seen to contact the belt drive roller 42 and the magnetic tape 38 convolutely wound on the reel 36. The magnetic tape 38 is also shown passing under the rim 62 of the belt drive roller 42.

The reels 34, 36, the belt drive roller 42 and the belt guide rollers 44, 46 shown in FIGS. 1 and 2 are rotatably mounted on axles which are fixed in the shell 32. The belt drive roller 42 and the belt guide rollers 44, 46 are preferably crowned to keep the belt 40 positioned thereon.

Figure 3:
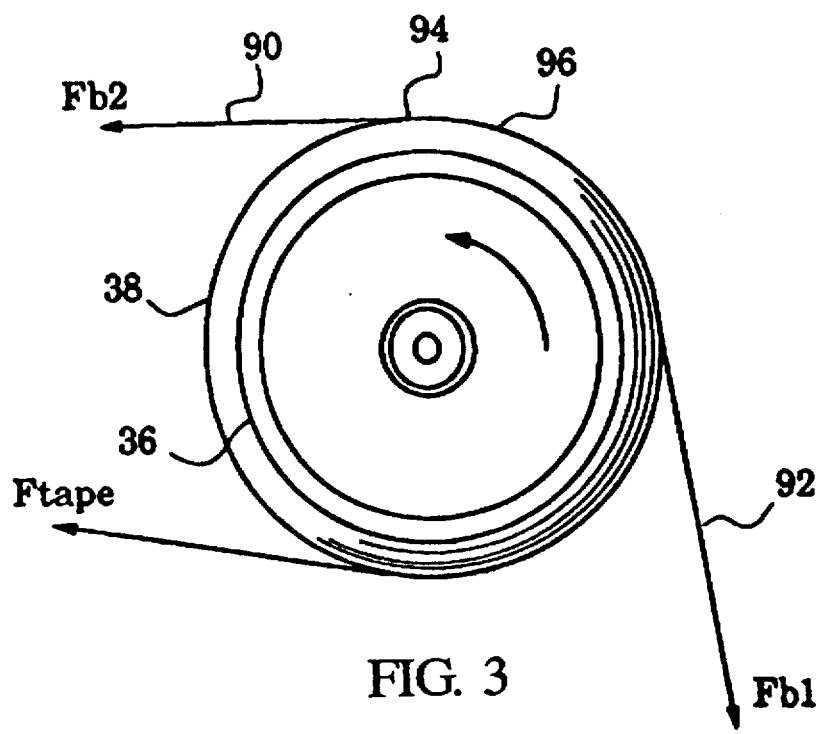
FIG. 3 is an illustration of belt and tape tensions on a take up reel of the tape cartridge of FIG. 1.

FIG. 3 is an exemplary force diagram illustrating the tensions on belt 40 with reference, for example, to take up reel 36 of FIG. 1. Of course, either reel 36 or 34 (FIGS. 1, 2) can function as the take up reel depending upon the direction of tape motion. Fb1 represents the force exerted by the belt 40 when it moves onto the take up reel 36 from the belt guide roller 46 (FIG. 1). Fb2 represents the belt force applied by the belt 40 when it moves away from the take up reel 36 towards the belt drive roller 42 (FIG. 1). Ftape represents the tape tension when it is wound onto the take up reel 36. It can be seen that the belt tension is higher on the departure side 90 of the belt than on the incoming side 92 because the departure belt tension Fb2 is the sum of the tape tension Ftape and the incoming belt tension Fb1. For example, if the incoming belt tension Fb1 is 16 ounces and the tape tension Ftape is 3 ounces, then the belt tension Fb2 on the departure side 90 has a tension of 19 ounces.

Therefore, the belt 40 will be stretched more at the departure side 90 of the take up reel. This stretching will not occur instantaneously but over some distance between a departure point 94 and a slip point 96 upstream along the belt as determined by the coefficient of friction between the tape 38 and the belt 40. For a large coefficient of friction $\mu_1$, the distance between the departure point 94 and the slip point 96 will be small, while for a small coefficient of friction $\mu_2$, it will be large.

Figure 4:
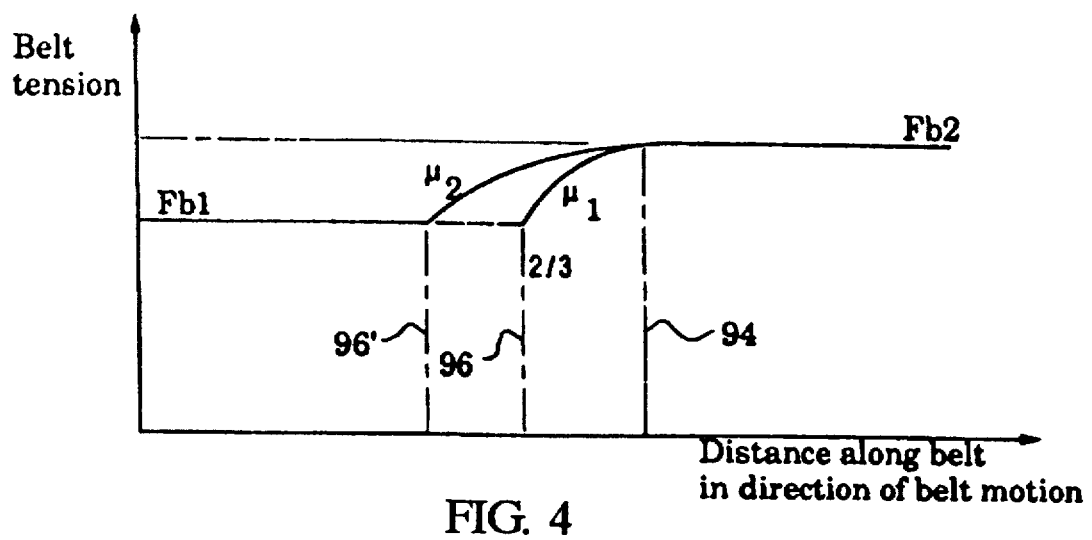
FIG. 4 is a graph of belt tension as a function of distance along the belt in the direction of belt motion on the take up reel of FIG. 3.

FIG. 4 is a graph of belt tension as a function of distance along the belt in the direction of belt motion on the take up reel of FIG. 3. For the large coefficient of friction $\mu_1$, the belt tension is Fb1 along the belt until the slip point 96 is reached. Once the belt has passed the departure point 94, the belt tension remains Fb2. In the transitional area between Fb1 and Fb2, the belt tension will follow a profile determined by the coefficient of friction. For a smaller coefficient of friction $\mu_2$, the slip point 96' is farther from the departure point 94.

When $\mu_1$ is the static coefficient of friction and $\mu_2$ the dynamic coefficient of friction of a belt, it can be seen from FIG. 4 that the profile being followed at a particular instant is determined by whether static or dynamic friction is dominant at that instant. Belts that have a high static coefficient of friction $\mu_1$ and a low dynamic coefficient of friction $\mu_2$ have a tendency to stick to the tape prior to slipping and stretching to a distance defined by the lower dynamic coefficient of friction $\mu_2$. The slip point 96, consequently, moves back and forth on reel 36. It should be noted that the values of the coefficient of frictions and the belt tension have to be chosen in such way that under maximal acceleration there is no complete slippage between belt and either tape reel.

This type of oscillation is called slip-stick motion and has a detrimental effect on tape tension. The tape dynamically balances the torques on the take up reel and the stress variations of the belt on the take up reel will cause significant tape tension variations. These tape tension variations cause speed variations at the transducer head 60 (FIG. 1) which reduce the accuracy of data readout. As is discussed in U.S. Pat. Nos. 5,203,519 and 5,314,140 (which are herein incorporated by reference), the ratio of static to dynamic coefficients of friction is preferably selected to be less than 2 to minimize these speed variations at the transducer head.

In order to reduce the likelihood of accumulating contaminants (e.g., debris or chemical compounds) on the belt surface over prolonged periods of use which could change the frictional characteristics of the belt, preferred embodiments of this invention provide shallow, but clearly visible (macroscopic), recesses in the belt surface in contact with the tape. These clearly visible recesses tend to trap and collect the contaminants below the belt surface in contact with the tape, thus reducing variations in frictional characteristics which might otherwise occur over prolonged periods of use.

Figure 5:
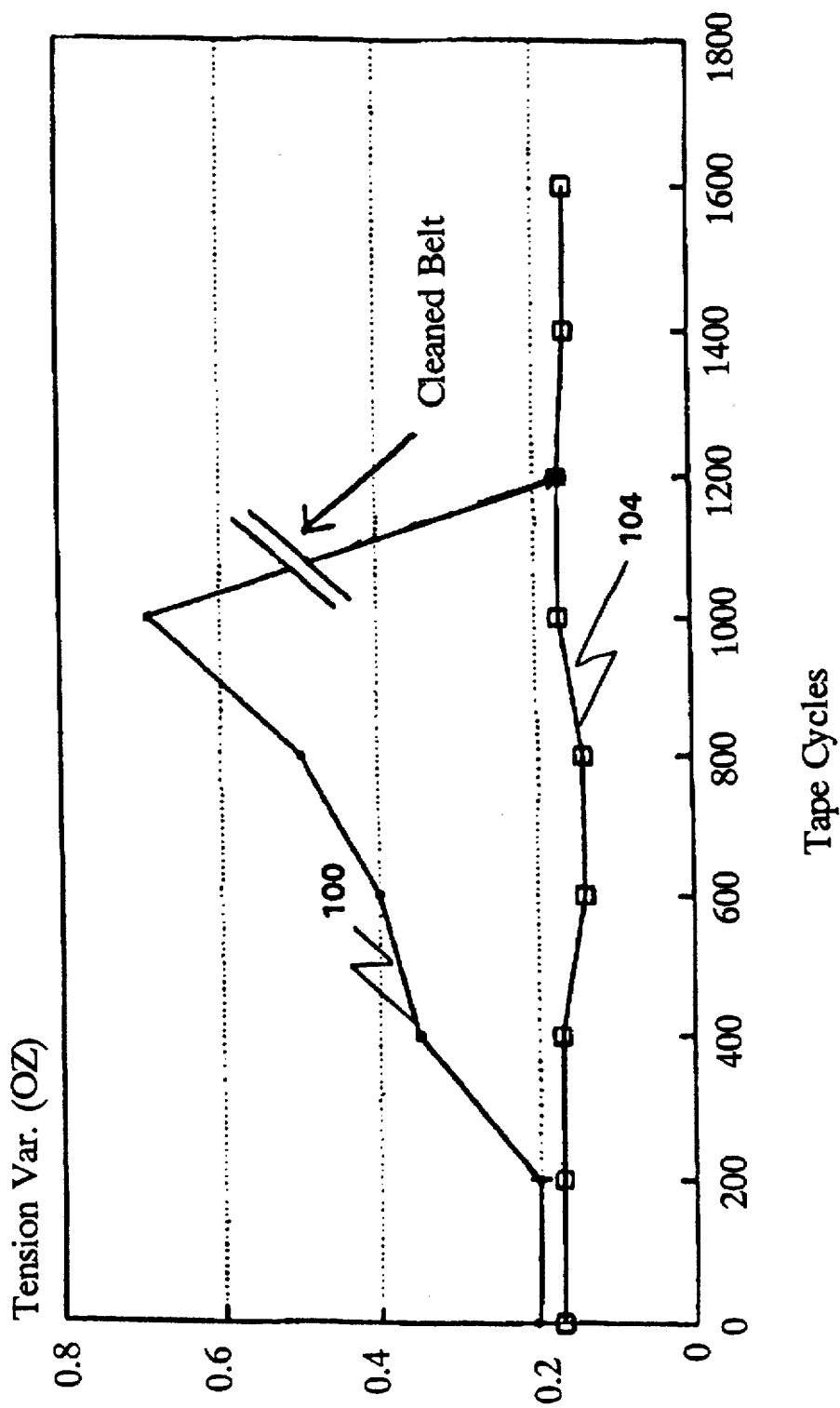
FIG. 5 is a chart which shows observed tape tension variations as a function of the number of tape cycles.

While a new prior art belt, having a nominal tape tension of 2 oz, may initially exhibit rapid tape tension variations of ±0.2 oz, after extended use the rapid tape tension variations may increase significantly, e.g., in the range of 1 oz at a tape speed of 120 inches per second. FIG. 5 is a chart which shows observed tape tension variations as a function of tape cycles for a typical prior art belt in curve 100 and for a patterned belt in accordance with the present invention in curve 104, both at 120 inches per second. In addition to the above described increase of rapid tape tension variations, a general decrease of average tape tension is observed; the rapid tape tensions being the more sensitive indicator.

FIG. 5 further depicts that by cleaning the prior art belt after approximately 1000 cycles (e.g., with isopropyl alcohol), the rapid tape tension variations of the prior art belt (shown in curve 100) was reduced to approximately that of a new belt and the average tape tension was restored to approximately that of a new belt. Belts made according to the present invention exhibit only minimal changes in tape tension variations over the tested range of cycles (shown in curve 104).

Figure 6A:
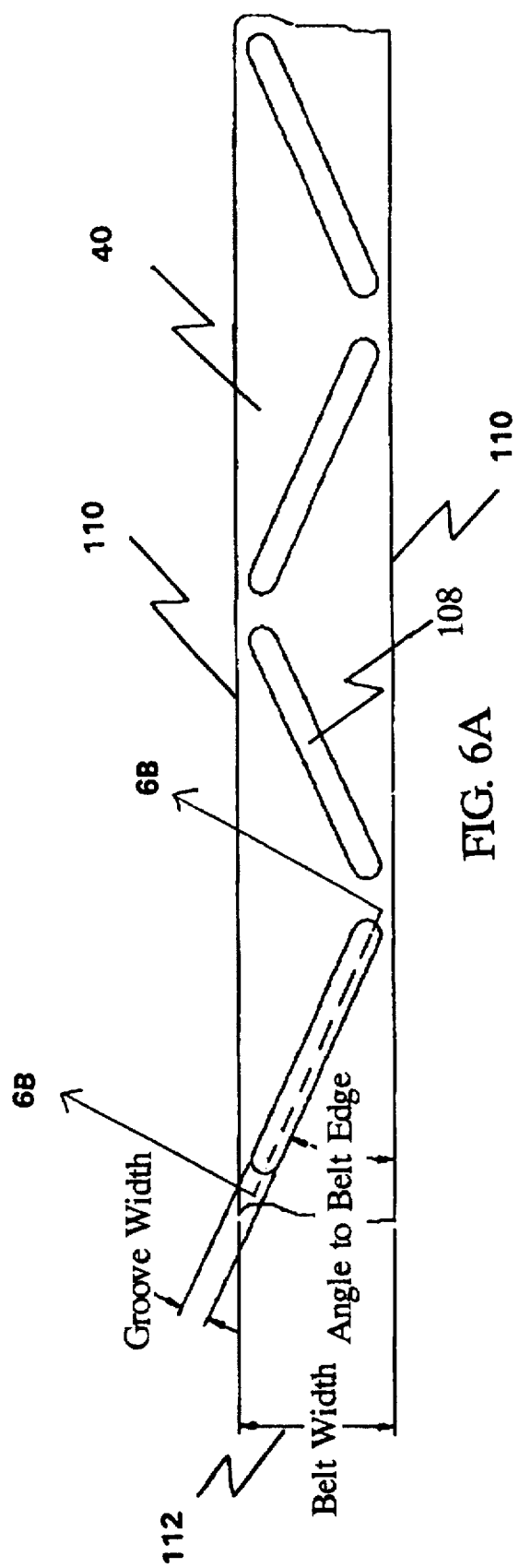
FIG. 6A shows a first preferred pattern of recesses formed on the inner surface of a drive belt in accordance with the invention.
Figure 6B:
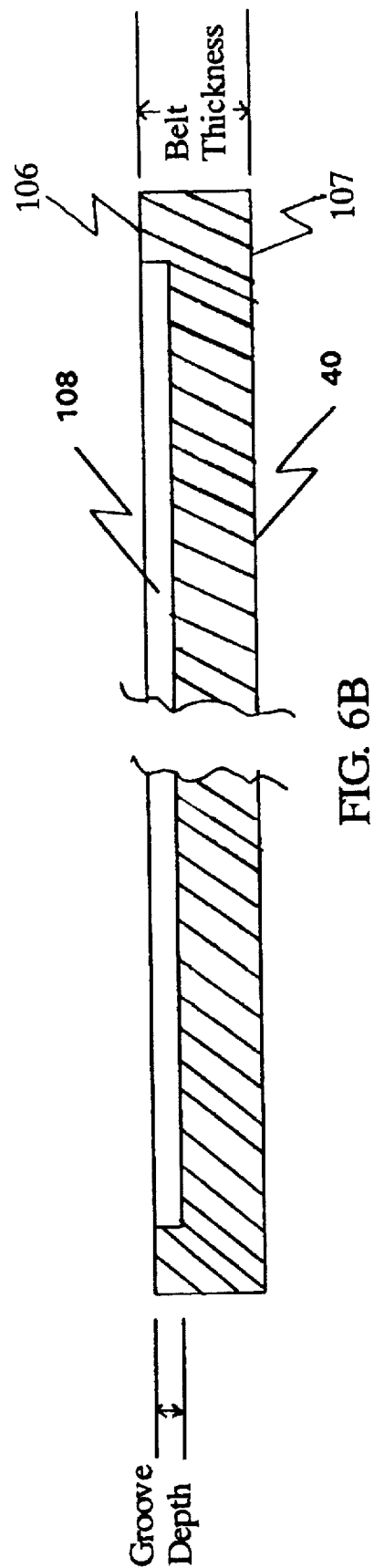
FIG. 6B is a sectional view along the line 6B—6B of FIG. 6A.

FIGS. 6A and 6B shows a first preferred pattern of elongate recesses or grooves formed extending from an inner surface 106 (the surface which makes contact with the magnetic tape 38 as shown in FIG. 1) towards an outer surface 107 of the drive belt 40. The grooves 108 in an exemplary preferred embodiment are approximately 0.0005 to 0.0015 inches deep, about 0.035" wide and 0.300" long with their axis inclined to the edge 110 of the belt 40 and having alternating angles, e.g., approximately 30°. The thickness of this exemplary belt is approximately 0.004" (see FIG. 6B). The grooves 108 are preferably placed close together such that the end of one groove 108 is adjacent to the beginning of the next one having an opposite inclination. The belt surface in contact with the tape is selected to have an average roughness Ra of less than 7 microinches as measured with the Talleysurf 10 at a scan length (meter cutoff setting) of 0.003".

In an exemplary manufacturing process, the grooves 108 are made by pressing or printing with an appropriately shaped wheel, containing a groove pattern, and heated to about 215° F. Heat and pressure will imprint the groove pattern from the wheel into the belt surface 106 as the heated wheel in contact with the belt 40 softens the plastic material of the belt 40.

The precise depth of the imprint is not believed to be very critical. However, recesses preferably have depths less than the thickness of the belt but sufficiently large such that the bottom of the recesses do not touch the tape, and preferably have widths of at least 0.0016". Successful results have been obtained with recess depth between 0.000050" to 0.003" with groove widths of about 0.035" and a belt thickness of about 0.004".

It should be clear to those skilled in the art that other recess patterns can be made that will also provide beneficial effects. Preferably each recess should have at least one dimension, e.g., width, which is small compared to the width 112 of the belt 40, e.g., less than 25% of the belt width. The recess pattern preferably extends over the entire width 112 of the belt 40. In this exemplary embodiment, at least one recess has a second dimension, e.g., length, that is greater than the width of the belt 40.

Figure 7:
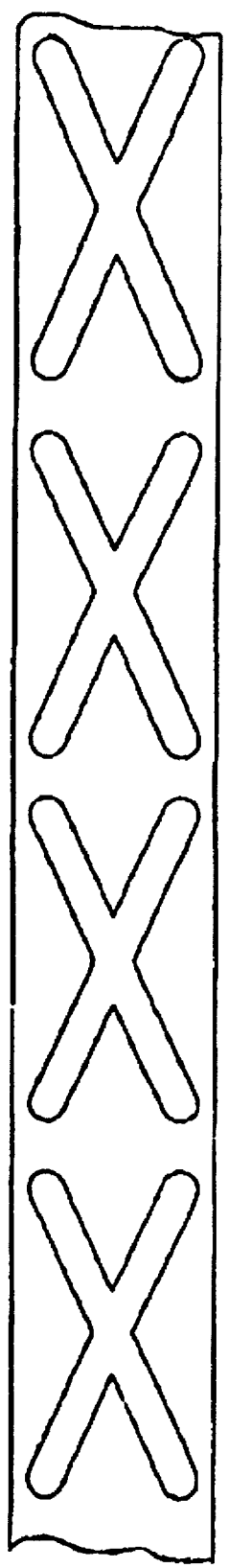
FIG. 7 shows another preferred pattern of recesses formed on the inner surface of a drive belt.
Figure 8:
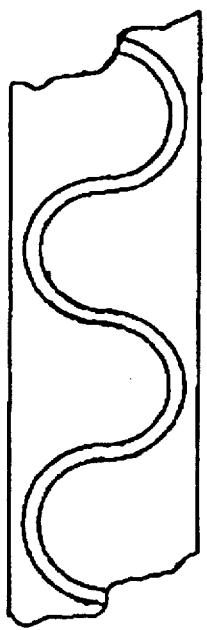
FIG. 8 shows another preferred pattern of recesses formed on the inner surface of a drive belt.
Figure 9:
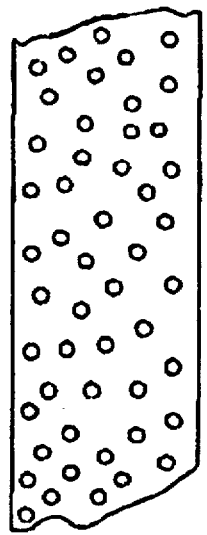
FIG. 9 shows another preferred pattern of recesses formed on the inner surface of a drive belt.
Figure 10:
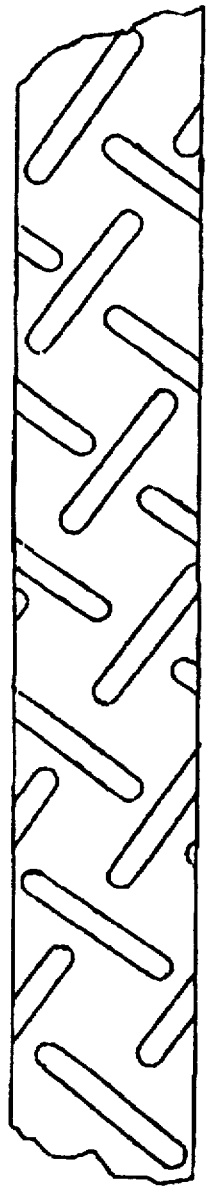
FIG. 10 shows another preferred pattern of recesses formed on the inner surface of a drive belt.

Examples of other preferred patterns are shown in FIGS. 7–10. FIG. 7 is a pattern of "X" shaped recesses, FIG. 8 a sinusoidal recess pattern between the tape edges, FIG. 9 is an essentially random pattern of circular recesses and FIG. 10 is a pattern of grooves with portions extending to the tape edges. FIG. 9 is a patterned belt that can preferably be made by imprinting a circular pattern on a thin plastic sheet made from belt material, cutting out a doughnut-shaped section, and then shaping the cutout into a belt by stretching it appropriately. FIG. 9 also represents an example where both dimensions of the recesses are small. The selected shape does not have to be round; other shapes can be used, for example rectangular or oval shapes.

Although we have expressly shown drive belts with various exemplary patterns of recesses, those of ordinary skill in the art will appreciate that other patterns, e.g., including variously inclined grooves, continuous grooves, etc., can also be used without departing from the invention. Accordingly, the invention is defined by the following claims.

I claim:

1. A tape cartridge comprising:
   a first reel mounted for rotation around its axis;
   a second reel mounted for rotation around its axis;
   a flat elongate magnetic tape extending between said reels having at least one end of said tape convolutely wound on one of said reels;
   tape guide means for bidirectionally moving said tape along a defined path from one of said reels to the other of said reels;
   a closed loop elongate drive belt having first and second elongate edges and having first and second drive belt surfaces;
   belt guide means supporting said drive belt for movement along a defined path maintaining an elongate portion of said first drive belt surface in contact with an elongate portion of a surface of said tape;
   said first drive belt surface having a frictional characteristic relative to said tape surface such that the ratio of static to dynamic coefficients of friction between said surfaces is less than 2;
   said first drive belt surface having a pattern of recesses formed thereon, each recess extending into said belt from said first drive belt surface toward said second drive belt surface and terminating in a recess bottom;
   said recesses each having a width which is less than 25% of the width of said belt and a depth sufficient to maintain the bottoms of said recesses spaced from said magnetic tape and wherein at least one of said recesses has a length greater than the width of said belt; and wherein
   said pattern of recesses is configured without forming an open channel extending between said first and second edges.

2. The tape cartridge of claim 1, wherein said recesses are essentially circular.

3. The tape cartridge of claim 1, wherein said pattern is comprised of one or more first elongate grooves having a first inclination toward the edge of said belt and one or more second elongate grooves having a second inclination toward the edge of said belt.

4. The tape cartridge of claim 1, wherein said recesses are oval.

5. The tape cartridge of claim 1, wherein said recesses are rectangular.

6. The tape cartridge of claim 1, wherein said recesses have depths between 0.00005" and 0.003" extending from said first drive belt surface toward said second drive belt surface and having widths of at least 0.0016".

7. A belt suitable for driving an elongate magnetic tape contained within a tape cartridge, comprising:
   a closed loop elongate drive belt having first and second elongate edges and first and second drive belt surfaces for contacting a surface of said magnetic tape;
   said first drive belt surface having a frictional characteristic relative to said tape surface such that the ratio of static to dynamic coefficients of friction between said surfaces is less than 2;
   said first drive belt surface having a pattern of recesses formed thereon, each recess extending into said belt from said first drive belt surface toward said second drive belt surface and terminating in a recess bottom;
   said recesses each having a width which is less than 25% of the width of said belt and a depth sufficient to maintain the bottoms of said recesses spaced from said magnetic tape and wherein at least one of said recesses has a length greater than the width of said belt; and wherein
   said pattern of recesses is configured without forming an open channel extending between said first and second edges.

8. The tape cartridge of claim 7, wherein said pattern is comprised of one or more first elongate grooves having a first inclination toward the edge of said belt and one or more second elongate grooves having a second inclination toward the edge of said belt.

9. The tape cartridge of claim 7, wherein said recesses are oval.

10. The tape cartridge of claim 7, wherein said recesses are rectangular.

11. The tape cartridge of claim 7, wherein said recesses have depths between 0.00005" and 0.003" extending from said first drive belt surface toward said second drive belt surface and having widths of at least 0.0016".

12. A tape cartridge comprising:
   a first reel mounted for rotation around its axis;
   a second reel mounted for rotation around its axis;
   a flat elongate magnetic tape extending between said reels having at least one end of said tape convolutely wound on one of said reels;
   tape guide means for bidirectionally moving said tape along a defined path from one of said reels to the other of said reels;
   a closed loop elongate drive belt having first and second drive belt surfaces;
   belt guide means supporting said drive belt for movement along a defined path maintaining an elongate portion of said first drive belt surface in contact with an elongate portion of a surface of said tape;

said first drive belt surface having a frictional characteristic relative to said tape surface such that the ratio of static to dynamic coefficients of friction between said surfaces is less than 2; said first drive belt surface having a recessed pattern comprised of a continuous groove passing periodically between the opposing edges of said belt wherein said groove has a depth less than the thickness of said belt and selected such that the bottom of said groove does not contact said magnetic tape.

13. The tape cartridge of claim 12, wherein said continuous groove pattern is sinusoidal.

14. A belt suitable for driving an elongate magnetic tape contained within a tape cartridge, comprising:

a closed loop elongate drive belt having first and second drive belt surfaces for contacting a surface of said magnetic tape;

said first drive belt surface having a frictional characteristic relative to said tape surface such that the ratio of static to dynamic coefficients of friction between said surfaces is less than 2; said first drive belt surface having a recessed pattern comprised of a continuous groove passing periodically between the opposing edges of said belt wherein said groove has a depth less than the thickness of said belt and selected such that the bottom of said groove does not contact said magnetic tape.

15. The tape cartridge of claim 14, wherein said continuous groove pattern is sinusoidal.

* * * * *